United States Patent
Gross et al.

(10) Patent No.: US 6,195,037 B1
(45) Date of Patent: Feb. 27, 2001

(54) METHOD AND APPARATUS FOR INCREASED SYSTEM CAPACITY USING ANTENNA BEAMFORMING

(75) Inventors: Jonathan H. Gross, Gilbert; John Richard Erlick, Scottsdale; Thomas Peter Emmons, Jr., Mesa, all of AZ (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/323,349

(22) Filed: Jun. 1, 1999

(51) Int. Cl.[7] .................................................. H04B 7/185
(52) U.S. Cl. ........................................ 342/354; 342/357.01
(58) Field of Search ............................... 342/357.01, 352, 342/354; 455/12.1, 13.1

(56) References Cited

U.S. PATENT DOCUMENTS

| 5,367,304 | 11/1994 | Jan et al. | 342/352 |
| 5,561,836 | * 10/1996 | Sowles et al. | 455/12.1 |
| 5,563,606 | * 10/1996 | Wang | 342/354 |
| 5,589,834 | 12/1996 | Weinberg | 342/354 |
| 5,732,387 | * 3/1998 | Armbruster et al. | 701/206 |
| 5,736,959 | * 4/1998 | Patterson et al. | 342/354 |

FOREIGN PATENT DOCUMENTS

| 0549220 | 6/1993 | (EP) | H04B/7/204 |

* cited by examiner

Primary Examiner—Thomas H. Tarcza
Assistant Examiner—Dao L. Phan
(74) Attorney, Agent, or Firm—Frank J. Bogacz (57) ABSTRACT

In a satellite communications system (100), system capacity is improved using a satellite (110 and 120) that includes a main mission antenna (MMA) (310 FIG. 3), antenna subsystem (320), and controller (350). Antenna subsystem (320) comprises a beamformer and associated software to optimize the beam shape and cell position with respect to the satellite's location. In one example, beam optimization is performed using a location based on latitude. Satellite (110 and 120) determines its spatial position and determines its latitudinal location based on this position information. The satellite determines the number of cells, the cell sizes, and the beam steering angles required at this latitudinal location. In other cases, beam optimization is performed using a location based on latitude and longitude, system loading, and satellite health and status.

20 Claims, 4 Drawing Sheets

METHOD AND APPARATUS FOR INCREASED SYSTEM CAPACITY USING ANTENNA BEAMFORMING

FIELD OF THE INVENTION

The present invention relates generally to satellite communication systems and, more particularly, to a method and apparatus for increasing system capacity using antenna beamforming in satellite communications systems.

BACKGROUND OF THE INVENTION

A communications system has a service area associated with it. In satellite communication systems, this coverage area is provided by multiple satellites. The coverage area of individual satellites must be designed so that total system coverage is complete with overlap regions minimized and coverage gaps eliminated. Optimization of this problem is essential to provide complete coverage at minimal cost Thus, there continues to be a need for an improved technique for managing satellite antenna beam patterns in a satellite communications system. In particular, what are needed are a method and apparatus for establishing antenna beam patterns while increasing power efficiency and channel reuse efficiency for satellites in a satellite communications system.

BRIEF DESCRIPTION OF THE DRAWINGS

A more complete understanding of the invention can be derived by referring to the detailed description and claims when considered in connection with the figures, wherein like reference numbers refer to similar items throughout the figures, and:

DETAILED DESCRIPTION OF A PREFERRED EMBODIMENT

The method and apparatus of the present invention increase the power efficiency and channel reuse efficiency of satellites in a satellite communications system. Further, the method and apparatus of the present invention allows increased power efficiency and increased channel reuse efficiency by establishing antenna beam patterns for a satellite based on the satellite's location.

As used herein, the terms "cell", "beam", and "footprint" are not intended to be limited to any particular mode of generation and include those created by either terrestrial or satellite cellular communications systems and/or combinations thereof. The present invention is applicable to terrestrial-based and space-based communication systems. Systems may include satellites having low-earth, medium-earth and geo-synchronous orbits.

Figure 1:
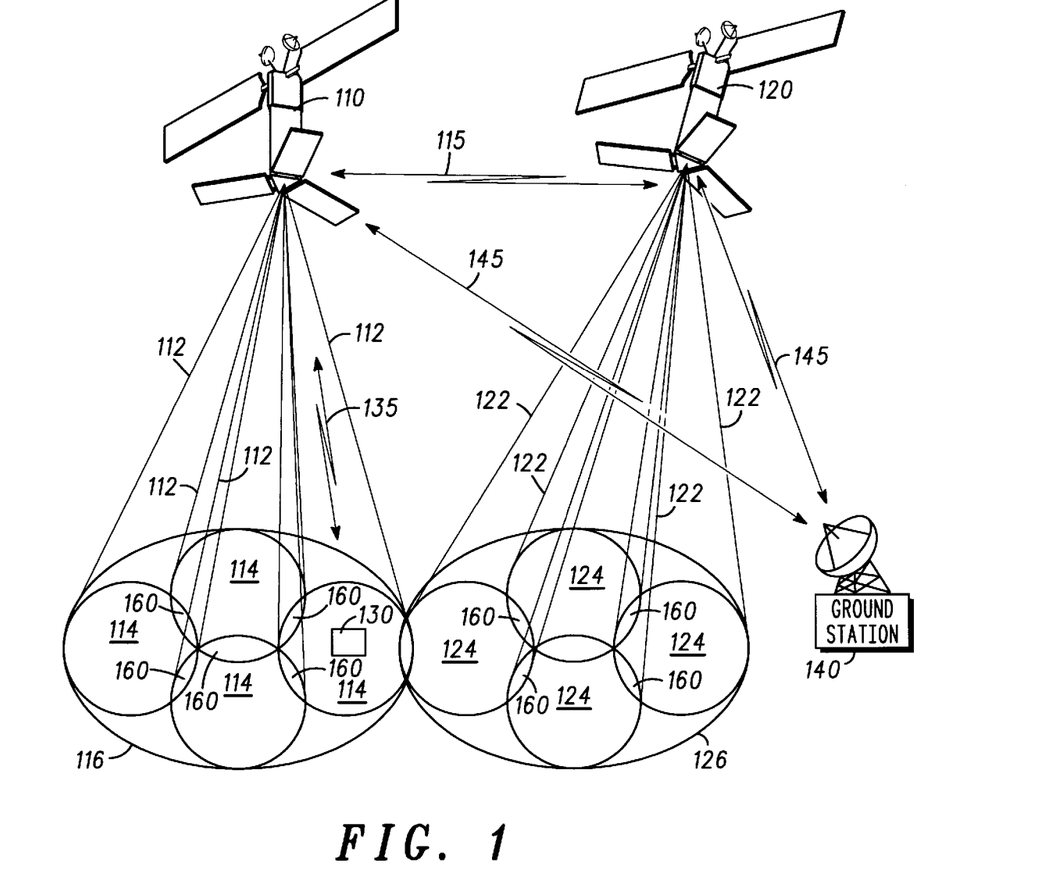
FIG. 1 illustrates a highly simplified block diagram of a satellite communications system in accordance with a preferred embodiment of the present invention.

FIG. 1 illustrates a highly simplified diagram of a satellite communications system in accordance with a preferred embodiment of the present invention. In a preferred embodiment, satellite communications system 100 comprises at least one first communications satellite 110, at least one second communications satellite 120, at least one subscriber unit (SU) 130, and at least one ground station 140.

For clarity, FIG. 1 illustrates a first communications satellite 110, a second communications satellite 120, a single SU 130, and a single ground station 140. This is done to facilitate the explanation of the invention. Different numbers of communications satellites, ground stations, and SUs can be used. While the present invention is advantageously employed when a large number of satellites are being used, it is also applicable with as few as a single satellite.

In a preferred embodiment, first communications satellite 110 and second communications satellite 120 are the same type of satellite. In alternate embodiments, first communications satellite 110 and second communications satellite 120 can be different. For example, first communications satellite 110 can be a low earth orbit (LEO) satellite and second communications satellite 120 can be a medium earth orbit (MEO) satellite. In addition, communications satellites can be non-geostationary (Non-GEO) and geostationary (GEO) satellites.

In a preferred embodiment, communications satellites 110 and 120 communicate with other communications satellites 110 and 120 using crosslinks 115. Desirably, a number of communications satellites and crosslinks are used and each satellite supports multiple crosslinks with other satellites. In alternate embodiments, various numbers of communications satellites and crosslinks can be used.

Communications satellites 110 and 120 communicate with ground stations 140 using communication links 145. Communications satellites 110 and 120 communicate with SUs 130 using communication links 135. In alternate embodiments, communications satellites 110 and 120 can communicate with other satellites 110 and 120 using bent pipe links with ground stations 140.

In a preferred embodiment, at least one ground station 140 is used as a system control center or is connected to one or more system control centers. In addition, ground station 140 can also be a gateway (GW) or be connected to one or more gateways, which provide access to at least one terrestrial-based communications network, such as the public switched telephone network (PSTN) or other communications facilities (not shown in FIG. 1). In alternate embodiments, ground stations 140 can be mobile and fixed communications devices, which transmit data to and receive data from satellites 110 and 120.

In a preferred embodiment, first communications satellite 110 includes at least one array antenna (not shown). Desirably, each array antenna, on first communications satellite 110, can establish numerous discrete antenna beams, as illustrated by 112. Beams 112 are projected at numerous diverse angles away from satellite 110. Beams 112 are used to establish cells 114 on the surface of the earth. A pattern of cells which first communications satellite 110 projects on the surface of the earth is illustrated in FIG. 1 as first footprint 116.

In a preferred embodiment, second communications satellite 120 includes at least one array antenna (not shown). Desirably, each array antenna, on second communications satellite 120 can establish numerous discrete antenna beams, as illustrated by 122. Beams 122 are projected at numerous diverse angles away from satellite 120. Beams 122 are used to establish cells 124 on the surface of the earth. A pattern of cells which second communications satellite 120 projects on the surface of the earth is illustrated as second footprint 126.

In a preferred embodiment, first footprint 116 and second footprint 126 comprise an equal number of cells during a first time period and comprise a different number of cells during a second time period. For convenience, FIG. 1 illustrates cells 114 and 124 as being discrete generally circular shapes. However, those skilled in the art will understand that the cells created by the beams projected from the antennas of satellites may have a shape that is different than a circular shape.

In FIG. 1, a number of overlap areas 160 are illustrated. In a preferred embodiment, overlap areas 160 are controlled and optimized at the cellular level. In alternate embodiments, overlap areas 160 can be controlled and optimized at the footprint level. In alternate embodiments, an overlap area can be established using one or more antennas on a single satellite. Desirably, SU 130 resides in an overlap region during hand-offs. In addition, overlap regions can include portions of two or more cells.

In FIG. 1, single coverage areas are areas within footprints in which only one beam can be seen by a SU. Desirably, power efficiency and channel reuse efficiency is optimized in both single coverage areas and overlap areas.

The invention is applicable to communications satellites 110 and 120 that use single or multiple beams pointed towards the earth, and preferably, to satellites that move cells across the surface of the earth along a deterministic ground track. In a preferred embodiment, the ground track is established by the orbital parameters associated with the satellite. The invention is also applicable to systems where full coverage of the earth is not achieved.

In a preferred embodiment, satellites 110 and 120 communicate with SUs 130 which are within one of its beams through links, such as illustrated by links 135. Subscriber links 135 can be established between a satellite and a SU that are within communication range of each other.

As shown in FIG. 1, SUs 130 are preferably communications devices, which receive data from and transmit data to communications satellites 110. By way of example, SUs 130 can be cellular telephones or two-way paging devices adapted to communicate with communications satellites 110 and 120. SUs 130 can be located anywhere on the surface of the earth or in the atmosphere above the earth. The invention is applicable to SUs that change location and SUs that do not change location.

In a preferred embodiment, communication paths, such as illustrated by links 115, 135 and 145 encompass a limited portion of the electromagnetic spectrum that is divided into channels. Links 115, 135 and 145 can encompass any suitable channel access scheme such as Frequency Division Multiple Access (FDMA) and/or Time Division Multiple Access (TDMA) and/or Code Division Multiple Access (CDMA) communications channels or combinations thereof.

In a preferred embodiment, satellites 110 and 120 maintain data records for beams 112, 122; cells 114, 124; and footprints 116 and 126. For example, data records can include location information, size information, and channel allocation information. Location information can include beam centering information and angle of arrival information. Size information can include dimensional information and shape information. Channel allocation information can include available channels and allocated channels. In a preferred embodiment, at least one ground station 140 also maintains data records for beams 112, 122; cells 114, 124; and footprints 116 and 126.

Figure 2:
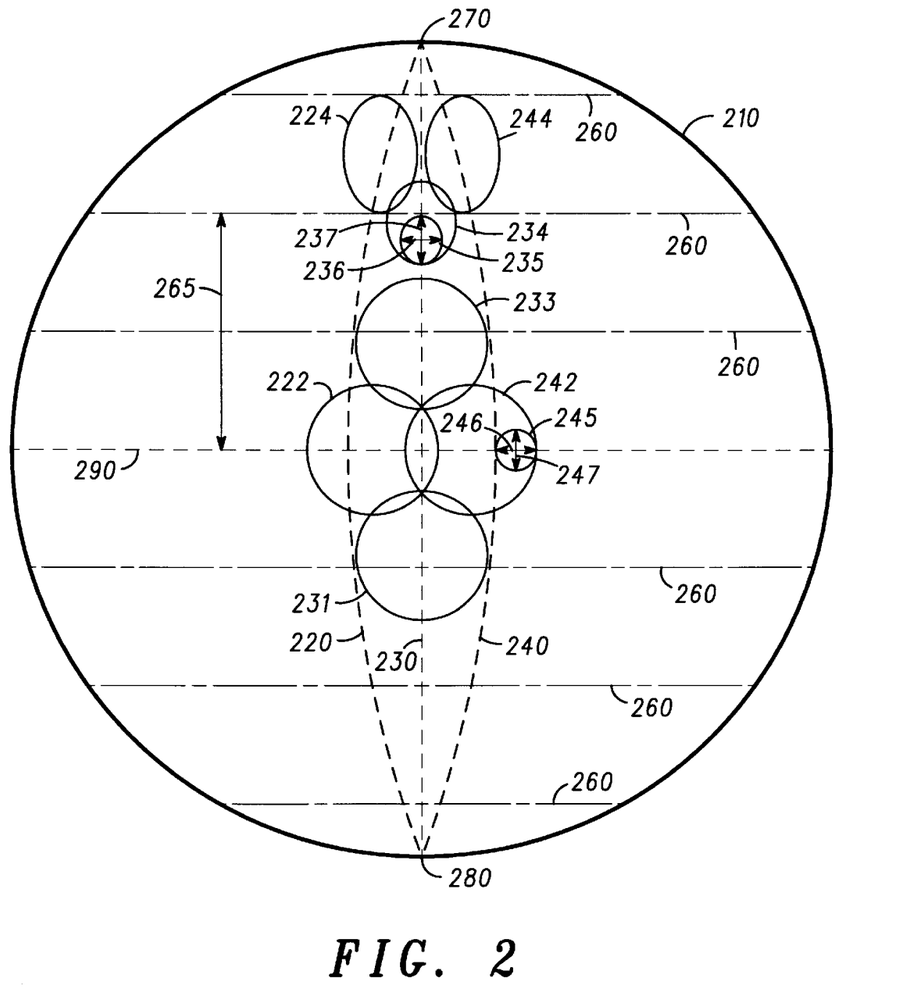
FIG. 2 illustrates a simplified top view of a number of ground tracks and footprints established by satellites in accordance with a preferred embodiment of the invention.

FIG. 2 illustrates a simplified view of a number of ground tracks and footprints established by satellites in accordance with a preferred embodiment of the invention. Equator 290 and lines of latitude 260 are illustrated on the Earth 210. Desirably, equator 290 divides the Earth 210 into two substantially equal and symmetrical parts.

In a preferred embodiment, lines of latitude 260 are used to establish angular distance from an equator. Desirably, the location of a satellite, at a particular point in time, comprises a latitude component that is determined using a point on the surface of the earth intersected by an imaginary line drawn from the center of the earth to the satellite. An imaginary line drawn on the Earth's surface by this point as the satellite completes one orbit can be used as the ground track for the satellite. In alternate embodiments, other coordinate systems that are not based on latitude and longitude can be used.

FIG. 2 also illustrates North Pole 270 and South Pole 280. Equator 290 is used to establish a zero degree line of latitude. North Pole 270 represents ninety degrees of latitude; South Pole 280 represents minus ninety degrees of latitude. Lines of longitude, which are known to those skilled in the art, are not illustrated.

In a preferred embodiment, satellite communications system 100 (FIG. 1) comprises low earth orbit (LEO) satellites. In a preferred embodiment, sixty-six satellites are used although more or fewer satellites can be used. For example, sixty-six satellites can be located in six orbital planes, which are equally spaced around the earth 210 at the equator.

In a preferred embodiment, satellites are located in polar orbits, although this is not necessary. For example, a polar orbital plane can have an inclination of ninety degrees plus or minus five degrees. In alternate embodiments, satellite orbital planes can vary between ninety degrees minus seventy degrees to ninety degrees plus seventy degrees.

FIG. 2 also illustrates ground tracks 220, 230, and 240. Desirably, ground tracks illustrate the relative movement of a satellite with respect to a point on the surface of the celestial body about which the satellite is orbiting. In a preferred embodiment, satellites are phased in their orbits so that they are distributed at varying points along ground tracks 220, 230, and 240. For example, satellites can be equally phased in their orbits. This means that satellites are phase-separated from each other within an orbital plane by a value of 360 degrees divided by the number of satellites in the plane.

In FIG. 2, antenna patterns 222, 231, 233, and 242 are shown having substantially circular shapes. In a preferred embodiment, antenna pattern 222 is associated with a first satellite; antenna pattern 231 is associated with a second satellite; antenna pattern 233 is associated with a third satellite; and antenna pattern 242 is associated with a fourth satellite. In alternate embodiments, multiple satellites can be associated with a single antenna pattern, as illustrated in FIG. 2, and a single satellite can be associated with a number of antenna patterns as illustrated in FIG. 2.

A number of overlap regions are also illustrated in FIG. 2 for antenna patterns 222, 231, 233, and 242. In a preferred embodiment, overlap regions are optimized using the method and apparatus of the present invention. Desirably, overlap regions are made large enough so that SUs can use them to is perform hand-offs from one beam to another and from one satellite's antenna pattern to another.

In FIG. 2, antenna pattern 222 and antenna pattern 242 are illustrated with their centers located on the equator. This is not necessary for the invention. The center of pattern 222 can be offset from the center of pattern 242. In addition, the antenna pattern size can be different than that illustrated. In addition, antenna pattern 231 and antenna pattern 233 are illustrated with their centers located on the same ground track. This is not necessary for the invention. Overlapping antenna patterns can be established using satellites in different orbital planes and having different ground tracks.

In FIG. 2, antenna patterns 224, 234, and 244 are shown having substantially elliptical shapes. In a preferred embodiment, antenna pattern 224 is associated with a fifth satellite; antenna pattern 234 is associated with a sixth satellite; and antenna pattern 244 is associated with a seventh satellite. A number of overlap regions are shown for antenna patterns 224, 234, and 244.

In a preferred embodiment, a cell is described using a horizontal dimension and a vertical dimension. Example cells 235 and 245 are illustrated in FIG. 2. For circular cells, such as illustrated by 245, horizontal dimension 246 and vertical dimension 247 are substantially equal when the cells are located near equator 290. For elliptical cells, such as illustrated by 235, shape, horizontal dimension 236 and vertical dimension 237 are not equal. Substantially circular cells and substantially elliptical cells are projected by the satellites at various points on the surface of the earth.

As illustrated in FIG. 2, antenna pattern 234 is centered at a particular latitude as illustrated by line of latitude 260. Distance 265 illustrates the difference between the location of antenna pattern 234 and equator 290. In a preferred embodiment, distance 265 is a measure of the angular difference between an antenna pattern and the equator. Desirably, this angular difference is identified using degrees of latitude ($\theta$). In addition, the cells, such as illustrated by 235 and 245, are located relative to line of latitude 260.

In a preferred embodiment, the horizontal dimension 236 and 246 is a function of latitude over at least a first set of latitudes. Desirably, when a satellite cannot support required cell changes due to latitude calculations, cells counts are changed, cell positions are changed, cell sizes are changed, and cell shapes are changed.

In alternate embodiments, the horizontal dimension and the vertical dimension can be functions of latitude. In other embodiments, the horizontal dimension and/or the vertical dimension can be functions of longitude. For example, in systems having satellites in inclined orbits the horizontal dimension and the vertical dimension could be functions of both latitude and longitude.

Figure 3:
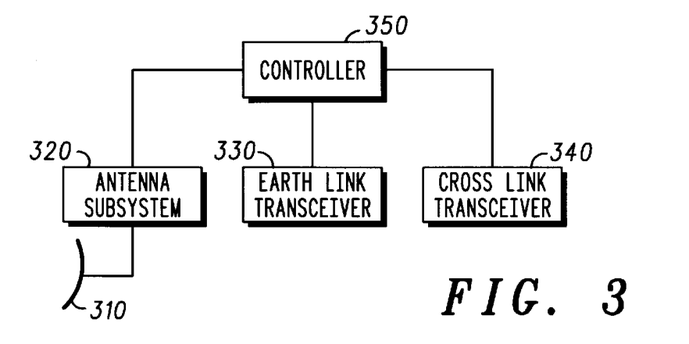
FIG. 3 illustrates a simplified block diagram of a communications satellite in accordance with a preferred embodiment of the invention.

FIG. 3 illustrates a simplified block diagram of a communications satellite in accordance with a preferred embodiment of the invention. Preferably, many or all satellites 110 and 120 (FIG. 1) within system 100 (FIG. 1) include equipment as illustrated by the simplified block diagram of FIG. 3. Satellites 110 and 120 comprise main mission antenna (MMA) 310, antenna subsystem 320, earth link transceiver 330, crosslink transceiver 340, and controller 350.

MMA 310 and antenna subsystem 320 establish the beams that are projected by the satellite. In addition, MMA 310 and antenna subsystem 320 support links to terrestrial-based subscriber units, such as SU 130 (FIG. 1). In a preferred embodiment, each satellite comprises at least one MMA and multi-channel transceivers which support a number of beams for communicating with a number of SUs.

Earth link transceiver 330 and associated antenna (not shown) support links to terrestrial-based communications devices, such as ground station 140 (FIG. 1). In a preferred embodiment, each satellite supports at least one earth link for communicating with at least one ground station. In addition, terrestrial-based communications devices can include gateways, and control centers.

Crosslink transceiver 340 and associated antenna (not shown) support crosslinks to other satellites 110 and 120 (FIG. 1). In a preferred embodiment, each satellite supports at least one crosslink for communicating with at least one other satellite in the same orbital plane or in an adjacent orbital plane.

Desirably, each satellite can simultaneously support a number of crosslinks, a number of earth links, and many subscriber links.

Controller 350 is coupled to antenna subsystem 320, earth link transceiver 330, and crosslink transceiver 340. Controller 350 could be implemented using one or more processors. Controller 350 controls the formation of crosslinks 115 (FIG. 1). In addition, controller 350 controls the formation of earth links 145 (FIG. 1).

In a preferred embodiment, controller 350 controls the formation of beams 112 and 122 (FIG. 1) by determining cell size, cell location, beam steering angle, satellite location, SU location, footprint size, overlap area, overlap location, and hand-off status. In addition, controller 350 is used for determining subscriber link resources that are available, for determining subscriber link resources that are required, and for determining how long subscriber link resources are required. In addition, controller 350 sends control information to subscriber link transceiver so that subscriber links can be handed-off at the appropriate times. In addition, controller 350 sends control information to antenna subsystem 320 so that subscriber link resources can be allocated and de-allocated at the appropriate times.

Controller 350 comprises memory means (not shown) for storing data that serve as instructions to controller 350 and that, when executed by controller 350, cause the satellite to carry out particular aspects of the method of the invention, as will be discussed in detail below. In addition, controller 350 desirably includes variables, tables, lists, and databases that are manipulated during the operation of the satellite.

In an alternate embodiment, satellites can comprise a GPS receiver, which can be used to geo-locate the satellite. For example, a GPS receiver can provide more accurate location information. In alternate embodiments, subscriber units and ground stations can also comprise GPS devices.

In a preferred embodiment, controller 350 is used to store data concerning the location of cells projected by this particular satellite and the locations of cells projected by neighboring satellites. For example, when a satellite decides to use a particular pattern of cells, this information is stored in this satellite, and it is sent to and stored in other neighboring satellites. Therefore, if a beam on a particular satellite fails, this information can be sent to neighboring satellites that can use this information to modify their cell pattern, reducing the effect of the failure.

For clarity and ease of understanding, FIG. 3 illustrates one MMA 310, one antenna subsystem 320, one earth link transceiver 330, one crosslink transceiver 340, and one controller 350. In alternate embodiments, several of these components could be used.

Antenna subsystem 320 processes received signals into digital data. In addition, antenna subsystem 320 processes digital data obtained from controller 350 into transmitted signals.

Controller 350 controls and manages user interfaces, message reception and transmission, channel set-up, radio tuning, frequency and time slot assignment, and other subscriber unit communication and control functions. Desirably, controller 350 carries out procedures exemplified below and described in the associated text.

In an alternate embodiment, a ground network controller (not shown) communicates to multiple satellites to optimize the system cell pattern. In this embodiment, the network controller modifies cell patterns based on the current status of all satellites. For instance, if a particular satellite has a hardware failure or insufficient power, the coverage area of this satellite is reduced, and the coverage area of the surrounding satellite is increased.

Figure 4:
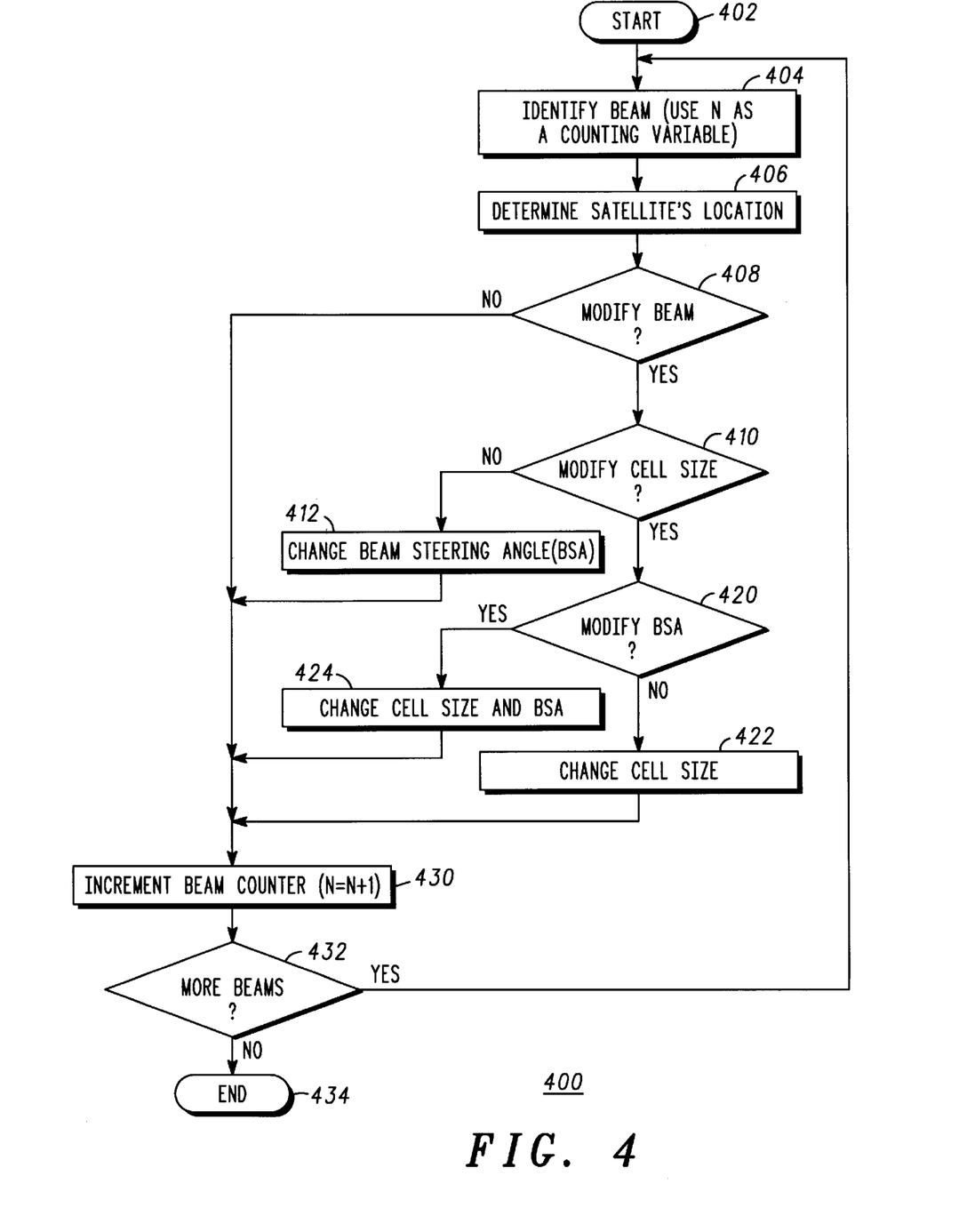
FIG. 4 illustrates a flowchart of a method for optimizing system performance in a satellite communications system performed in accordance with a preferred embodiment of the present invention.

FIG. 4 illustrates a flowchart of a method for optimizing system performance in a satellite communications system performed in accordance with a preferred embodiment of the present invention. Procedure 400 starts in step 402. In step 402, the currency and accuracy of location information can be determined. Current and accurate location information is important in a satellite communications system for optimizing and maintaining system performance.

In step 404, a beam on a particular satellite is identified, and a counting variable (N) is associated with the beam. In a preferred embodiment, beams are processed individually. In alternate embodiments, groups of beams could be examined, counting variables could be established for groups and cells within groups. In other embodiments, beam formation can be based on lists and tables which are dependent on the location of the satellite.

In step 406, the location of the satellite is determined. In a preferred embodiment, the satellite can determine its location using internal guidance information or information received from the communication system. In alternate embodiments, the satellite can obtain location information from a GPS receiver on-board. Location information is used to determine the satellite's location with respect to the equator.

In addition, the location of the satellite is determined relative to lines of latitude, where lines of latitude are used to establish angular distance from the equator. Desirably, a location of a satellite is presented in terms of latitude determined using a point on the surface of the Earth intersected by an imaginary line drawn from the center of the Earth to the satellite. Desirably, the location of the satellite is defined by positive degrees when the satellite is north of or above an equator. The location of satellite is defined by negative degrees when the satellite is south of or below the equator.

In step 408, a query is performed to determine if this particular beam needs to be modified based on the current latitude of the satellite. In alternate embodiments, the current longitude of the satellite, the current loading of the satellite relative to its neighboring satellites, and the current health and status of the satellite and its neighboring satellites may also be used to determine if a beam needs to be modified. When this particular beam needs to be modified, then procedure 400 branches to step 410. When this particular beam does not need to be modified, then procedure 400 branches to step 430.

In step 410, a query is performed to determine if the cell size needs to be modified. When the cell size does not require modification, then procedure 400 branches to step 412. When the cell size does require modification, then procedure 400 branches to step 420.

In a preferred embodiment, the beam steering angle (BSA) is determined in three-dimensional space, and azimuth and elevation angles are determined. A first line is established from the satellite to the center of the Earth. The point at which this line intersects an arbitrary surface represents a point on the ground track of the satellite. As the satellites orbits the Earth this intersection point moves around the Earth creating an imaginary line called the ground track. A second line is established from the satellite to the center of the cell being examined. These two lines are used to establish a two-dimensional plane. The intersection point for the two lines occurs at the satellite and the angle formed by the two lines in the two-dimensional plane is identified as the beam steering angle.

In alternate embodiments, the beam steering angle can be computed in two dimensions. In other embodiments, the beam steering angle does not have to be determined using the center of the cell. For example, a point of the circumference may be used.

In step 412, the beam steering angle is changed. In a preferred embodiment, modifying a set of electrical parameters, associated with the antenna array and antenna subsystem, changes the beam steering angle. In alternate embodiments, one or more mechanical properties associated with an antenna can be changed. In other embodiments, both electrical and mechanical properties can be modified. Procedure 400 continues with step 430.

In step 420, a query is performed to determine if the beam steering angle needs to be modified. When the beam steering angle does not require modification, then procedure 400 branches to step 422. When the beam steering angle does require modification, then procedure 400 branches to step 424.

In step 422, the cell size is changed. In a preferred embodiment, modifying the antenna gain changes the cell size. Procedure 400 continues with step 430.

In step 424, the cell size and beam steering angle are changed. In a preferred embodiment, modifying the antenna gain changes the cell size. Procedure 400 continues with step 430.

In step 430, the beam counter is incremented (N=N+1).

In step 432, a query is performed to determine if additional beams require processing. When additional beams require processing, then procedure 400 branches to step 404 and iterates as shown in FIG. 4. When additional beam processing is not required, procedure 400 branches to step 434 and ends.

Those skilled in the art will recognize that the steps described above do not need to be performed in the sequence listed above. The sequence is not important to the nature of the present invention. Those skilled in the art will also recognize that some satellites perform different tasks at different times.

In addition, those skilled in the art will also recognize that a ground controller can be used to perform some or all of the steps described above. The ground controller can provide information to the satellites and obtain information from the satellites. For example, the controller can obtain satellite performance parameters from the satellites and provide beam steering angle and cell size information to one or more satellites.

In order to maximize constellation capacity and coverage, the antenna pattern associated with the main mission antenna (MMA) is changed as a function of latitude. In alternate embodiments, longitude, system loading, and the health and status of the satellite and neighboring satellites may also be used to modify the antenna pattern. Desirably, the satellite footprint is established to provide full coverage at the equator. At higher latitudes, the satellite footprint is reduced to conserve power. Reducing the satellite footprint also provides the opportunity to reduce the size of the beams (cells) for a given MMA aperture, thereby increasing beam gain, power efficiency and spectral efficiency. Systems, which reduce the footprint of the satellite by shutting beams down, do not allow for the optimization of spectral capacity. In alternate embodiments, the satellite footprint is also modified to more evenly distribute traffic loading across satellites, thereby increasing overall system capacity. In alternate embodiments, the satellite footprint may be modified to restore coverage over areas serviced by failed or partially failed satellites, thereby increasing system fault tolerance, and reliability.

In a preferred embodiment, beamforming is used to optimize the system performance by allowing significant power reductions, improved spectral efficiency, increased capacity, and increased fault tolerance.

As a satellite moves from the equator to higher latitudes, the area required to provide full coverage around the Earth is reduced. In a preferred embodiment, an algorithm is employed to reduce this area by increasing the gain of the spoiled inner beams. This increased antenna gain leads to a reduction in the area covered by the antenna. In addition, as a satellite moves towards the equator in the lower latitudes, the area required to provide full coverage around the Earth increases.

Figure 5:
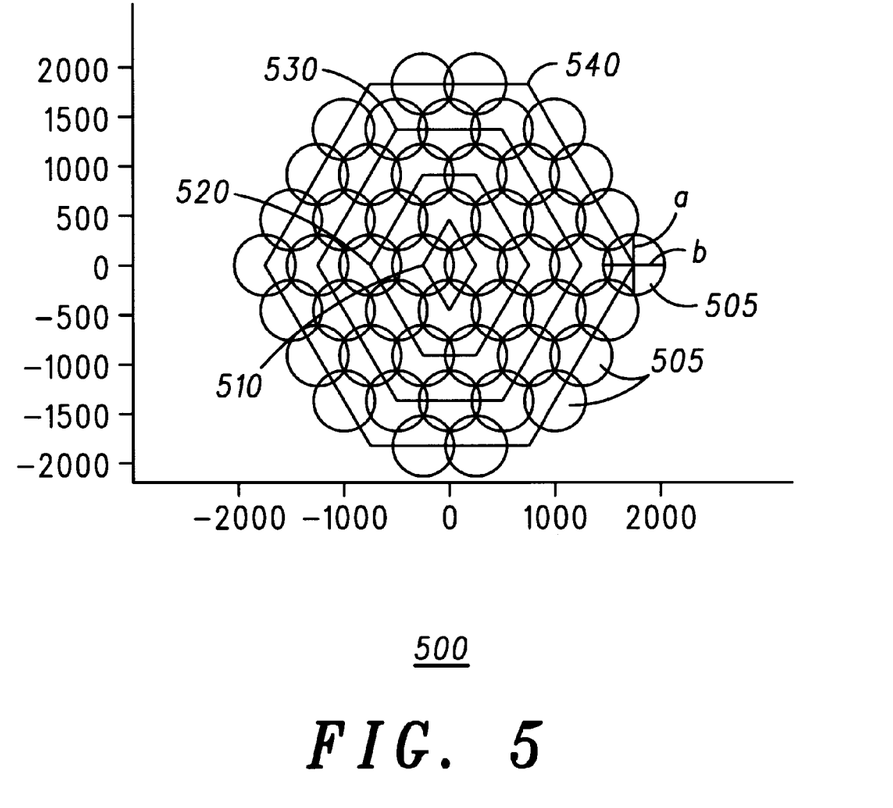
FIG. 5 illustrates a top view of an exemplary antenna pattern associated with a satellite in accordance with a preferred embodiment of the present invention.

FIG. 5 illustrates an exemplary antenna pattern associated with a satellite in accordance with a preferred embodiment of the present invention. In this example, an antenna pattern 500 is illustrated as a pattern of cells 505, which can be grouped together in ring-like patterns as illustrated by 510, 520, 530 and 540.

The beam pattern associated with a satellite's MMA is initialized during the system design phase and optimized during the operational phase. In a preferred embodiment, the beam pattern is optimized based on the latitudinal location of the satellite. The footprint of the satellite is reduced to conserve power and increase spectral efficiency. In alternate embodiments, the beam pattern is optimized based on longitudinal location, system loading and load uniformity, and the health and status of the satellite and its neighboring satellites.

Satellites in a constellation are positioned with respect to one another so that a certain amount of area on the Earth is covered during a given amount of time. In some cases, full global coverage is always provided. In other cases, partial coverage is provided.

In a preferred embodiment, N orbital planes are established, and M satellites are positioned in each orbital plane. Dividing the Earth's circumference into 2*N pieces establishes an optimum diameter for each circularly shaped antenna footprint. Typically, the diameter is used to determine the maximum number of cells required for full coverage at the equator. When circular cells are used with no overlap on the equator, then a distance equal to the cell diameter can separate cell centers. When circular cells are used with overlap, then the cell centers are spaced at a distance that is less than the cell diameter.

For example, consider the case illustrated in FIG. 5 where antenna pattern 500 is slightly less than eight cells wide at the equator. If six orbital planes are used and the circumference of the earth is assumed to be $2*\Pi*6378$ kilometers (km), then each cell is approximately $2*\Pi*6378/(12*8)=$ 517 km in diameter.

When the cells in an antenna pattern have substantially the same size, the outer beams (cells) in the pattern of cells from this particular antenna have the maximum gain associated with them. Desirably, the gain of the inner beams is reduced (spoiled) in order to provide substantially the same coverage area (size) for each cell. This approach maximizes performance, as measured by power efficiency and spectral efficiency, at the equator for a given number of beams (cells).

When the antenna pattern is viewed as a series of four rings of cells, as shown in FIG. 5, then the cell size changes and beam steering angle changes are accomplished using the rings as subsets of cells.

For example, when the beams in the inner ring 510 have their gain increased, then their cell sizes and associated coverage areas are reduced. In addition, the beam steering angles associated with the cells within ring 510 are changed. Desirably, the cells in inner ring 510 have substantially equal size, although this is not required for the invention.

When changes are made to the cells in the inner ring, the size and/or location of the cells in the next ring 520 are adjusted to compensate for the coverage area changes. Cell locations are changed by making changes to the associated beam steering angles. Typically, decisions affecting when the cell size is changed and when the beam steering angles are changed are determined based on the satellite's current location as described in procedure 400. When the coverage area associated with the cells in the inner ring is reduced, beam steering angles associated with the cells in ring 520 are reduced to bring the cells in this ring closer to the center, and the cell sizes are reduced in ring 520.

In addition, when changes are made to the cells in ring 510 and ring 520, the size and/or location of the cells in ring 530 are adjusted to compensate for the coverage area changes. When the coverage area associated with the cells in the inner rings is reduced, beam steering angles associated with the cells in ring 530 are modified to bring the cells in this ring closer to the center, and the cell sizes are reduced in ring 530.

Finally, when changes are made to the cells in ring 510, ring 520, and ring 530, the size and/or location of the cells in ring 540 are adjusted to compensate for the coverage area changes. When the coverage area associated with the cells in the inner rings is reduced, beam steering angles associated with the cells in ring 540 are modified to bring the cells in this ring closer to the center, and the cell sizes are reduced in ring 540.

In other embodiments, the antenna pattern can be viewed as a plurality of rows of cells. In these embodiments, the cell size changes and beam steering angle changes are accomplished using the rows as subsets of cells. Desirably, the cells in the first row are modified first since these cells on the forward edge of an antenna pattern.

In alternate embodiments, cell size and beam steering angle information can be pre-computed and stored in tables. For example, pre-computed tables could be accessed as a function of the latitude of the satellite. Typically, beamforming calculations are complex and require significant computational resources. A table driven system could reduce the computational load on the satellite. This can lead to size, weight, and power reductions.

In other embodiments, the cell size and beam steering angle can be dependent on both latitude and longitude. For example, satellite position can be established based on both latitude and longitude; cell position can be established on both latitude and longitude; cell size can be established based on both latitude and longitude; and beam steering angles can be based on both latitude and longitude.

In additional embodiments, tables can be used to store non-uniform cell sizes, which are based on latitude and user density. For example, user density is higher in urban areas, and smaller cells could be used to provide coverage to urban areas.

In additional embodiments, the cell size and beam steering angle can be dependent on the health and status of a satellite and its neighboring satellites. For example, if a satellite is partially failed, its coverage area could be reduced, while the coverage area of its neighboring non-failed satellites could be increased, maintaining overall system coverage.

In a preferred embodiment, satellites orbit the earth in polar orbits. For satellites in polar orbits, satellite footprints can be approximated by ellipses. The method for determining the area of an ellipse is well known (e.g., Area=$\Pi*a*b$ where "a" is the major axis and "b" is the minor axis).

At the equator, the major and minor axes are equal and the footprint becomes circular. In a preferred embodiment, the minor axis of the ellipse decreases as the latitude of the satellite increases. The minor axis is determined by:

$$b = a*\cos(\theta), \text{ for } \theta = < \theta_0$$

$$b = b_0, \text{ for } \theta > \theta_0$$

where $\theta$ is latitude, $b_0$ is determined by the smallest beam width that the antenna aperture will support and is assumed to be much less than the circumference of the earth. For $\theta > \theta_0$, the maximum realizable gain is achieved (i.e., $b_0 = a*\cos(\theta_0)$). The area of the footprint using these assumptions is then $$A(\theta) = \Pi*a*a*\cos(\theta), \text{ for } \theta = < \theta_0$$

$$A(\theta) = \Pi*a*b_0, \text{ for } \theta > \theta_0$$

If the area of each beam is assumed to be the same, and the area is reduced uniformly over the satellite footprint with increasing latitude (up to $\theta = \theta_0$), then the increase in power efficiency is given by $$\Delta P_{eff}(\theta) = A_0/A(\theta) = 1/\cos(\theta), \text{ for } \theta = < \theta_0$$

$$\Delta P_{eff}(\theta) = a/b_0, \text{ for } \theta > \theta_0.$$

If the orbit of the satellite is inclined such that the footprint size is uniformly reduced with increasing latitude, then both the major axis and minor axis are functions of latitude. In this embodiment, the size of each beam is uniformly reduced, within the limits that the MMA aperture allows. This provides an increase in both power efficiency and spectral efficiency with increasing latitude. In this case, the total satellite footprint area is given by $$A(\theta) = \Pi*a*\cos(\theta)*a*\cos(\theta), \text{ for } \theta = < \theta_0$$

$$A(\theta) = \Pi*b_0*b_0, \text{ for } \theta > \theta_0.$$

The increase in power efficiency with increasing latitude is given by $$\Delta P_{eff}(\theta) = A_0/A(\theta) = 1/[\cos(\theta)*\cos(\theta)], \text{ for } \theta = < \theta_0$$

$$\Delta P_{eff}(\theta) = (a/b_0 * a/b_0), \text{ for } \theta > \theta_0.$$

When both the major axis and minor axis of the ellipse are functions of latitude, then the increase in power efficiency is the square of the power efficiency achieved when only the minor axis is a function of latitude. For example, the minor axis is a function of latitude when satellites are in polar orbits, and the minor and major axes are functions of latitude when satellites are in nonpolar (inclined) orbits.

When both the major axis and minor axis of the ellipse are functions of latitude, then beam footprint size can be uniformly reduced and corresponding increases in spectral efficiency are achievable. Spectral efficiency is determined using the number of beams per unit area. With this approach, the number of beams is fixed, and the footprint area is reduced. Therefore, the increase in spectral efficiency is also given by $$\Delta S_{eff}(\theta) = A_0/A(\theta) = 1/[\cos(\theta)*\cos(\theta)], \text{ for } \theta = < \theta_0$$

$$\Delta S_{eff}(\theta) = (a/b_0 * a/b_0), \text{ for } \theta > \theta_0.$$

Therefore, a corresponding capacity increase is realized for power limited and/or spectrally limited systems.

The method and apparatus of the present invention provides a means for optimizing beam shape with respect to latitude in a satellite communications system. This eliminates the problems associated with shutting down beams to decrease coverage areas in a communications system. While the principles of the invention have been described above in connection with specific apparatus, it is to be clearly understood that this description is made only by way of example and not as a limitation on the scope of the invention.

What is claimed is:

1. A method for increasing system capacity in a satellite communications system comprising a plurality of communications satellites, wherein a satellite comprises an array antenna and beamformer for providing a plurality of beams, said method comprising the steps of:
   (a) determining a location for said satellite, said location being determined using latitude, said latitude being an angular distance measured in degrees from an equator;
   (b) establishing said plurality of beams based on said location;
   (b1) identifying a first beam in said plurality of beams;
   (b2) determining whether said first beam requires modification based on said location for said satellite;
   (b2a) determining whether cell size modification is required for said first beam; and
   (b2b) modifying a cell diameter to accomplish said cell size modification.

2. The method as claimed in claim 1, wherein said method further comprises the step of:
   (c) determining said location of the satellite using longitude, said longitude being an angular distance established in degrees at said equator.

3. The method as claimed in claim 1, wherein step (b2) further comprises the steps of:
   (b2a) determining whether beam steering angle modification is required for said first beam; and
   (b2b) modifying distance between cell centers to accomplish said beam steering angle modification.

4. The method as claimed in claim 1, wherein step (b2) further comprises the steps of:
   (b2a) determining whether cell size modification is required for said first beam; and
   (b2b) modifying a minor axis of a cell to accomplish said cell size modification.

5. The method as claimed in claim 1, wherein step (b2) further comprises the steps of:
   (b2a) determining whether beam steering angle modification is required for said first beam; and (b2b) modifying distance between cell focal points to accomplish said beam steering angle modification.

6. The method as claimed in claim 1, wherein step (b) further comprises the steps of:
- (b3) identifying a second beam in said plurality of beams; and
- (b4) determining whether said second beam requires modification based on said location of said satellite.

7. The method as claimed in claim 1, wherein step (b) further comprises the steps of:
- (b3) identifying a second beam in said plurality of beams;
- (b4) identifying a location of a second cell associated with said second beam; and
- (b5) determining whether said second beam requires modification based on said location of said satellite and said location of said second cell.

8. The method as claimed in claim 1, wherein step (b2) further comprises the steps of:
- (b2a) identifying a location of a first cell associated with said first beam; and
- (b2b) determining whether said first beam requires modification based on said location of said satellite and said location of said first cell.

9. The method as claimed in claim 1, wherein step (b2) further comprises the steps of:
- (b2a) identifying a location of a first cell associated with said first beam; and
- (b2b) determining whether said first beam requires modification based on said location of said satellite and a time of day at said location of said satellite.

10. The method as claimed in claim 1, wherein step (b) further comprises the steps of:
- (b1) identifying a first set of beams in said plurality of beams; and
- (b2) determining whether said first set of beams requires modification based on said location for said satellite.

11. The method as claimed in claim 1, wherein step (b) further comprises the steps of:
- (b1) identifying a first set of beams in said plurality of beams;
- (b2) identifying a location of a first set of cells associated with said first set of beams; and
- (b3) determining whether said first set of beams requires modification based on said location of said satellite and said location of said first set of cells.

12. The method as claimed in claim 11, wherein step (b) further comprises the steps of:
- (b4) identifying a second set of beams in said plurality of beams;
- (b5) identifying a location of a second set of cells associated with said second set of beams; and
- (b6) determining whether said second set of beams requires modification based on said location of said satellite and said location of said second set of cells.

13. The method as claimed in claim 12, wherein said first set of beams and said second set of beams are identified using a table stored in said satellite.

14. The method as claimed in claim 12, wherein said first set of beams and said second set of beams are identified using a ring-like groups of cells.

15. The method as claimed in claim 12, wherein said first set of beams and said second set of beams are identified using a rows of cells.

16. The method as claimed in claim 11, wherein step (b3) further comprises the steps of:
- (b3a) determining whether cell size modifications are required for said first set of cells;
- (b3b) modifying cell diameters to accomplish said cell size modifications;
- (b3c) determining whether beam steering angle modifications are required for said first set of beams; and
- (b3d) modifying distances between cell centers to accomplish said beam steering angle modifications.

17. The method as claimed in claim 11, wherein step (b3) further comprises the steps of:
- (b3a) determining whether cell size modifications are required for said first set of cells;
- (b3b) modifying minor axes of cells to accomplish said cell size modifications;
- (b3c) determining whether beam steering angle modifications are required for said first set of beams; and
- (b3d) modifying distances between cell focal points to accomplish said beam steering angle modifications.

18. The method as claimed in claim 11, wherein step (b) further comprises the steps of:
- (b4) identifying a second set of beams in said plurality of beams;
- (b5) identifying a location of a second set of cells associated with said second set of beams; and
- (b6) determining whether said second set of beams requires modification based on said location of said satellite and the operational status of said first set of beams.

19. In a communications system having a plurality of subscriber units (SUs), and a plurality of communications satellites, a satellite for performing location-based beamforming procedures, said satellite comprising:
- a main mission antenna (MMA) for establishing a plurality of beams, said beams providing communications links with at least one of said plurality of SUs;
- an antenna subsystem coupled to said MMA;
- an earth link transceiver for providing a link to a terrestrial-based communications device;
- a crosslink transceiver for providing crosslinks to other satellites;
- a controller coupled to said antenna subsystem, to said earth link transceiver, and to said crosslink transceiver, said controller for determining a latitudinal location for said satellite, for processing said plurality of beams, for determining cell sizes and beam steering angles using said latitudinal location;
- means for modifying a cell's size diameter, said means for modifying coupled to the controller and MMA; and
- means for modifying a beam steering angle coupled to the controller and MMA.

20. The satellite as claimed in claim 19, wherein said satellite further comprises:
- means for modifying cell sizes for a set of cells; and
- means for modifying beam steering angles for said set of cells.

* * * * *